UNITED STATES PATENT OFFICE.

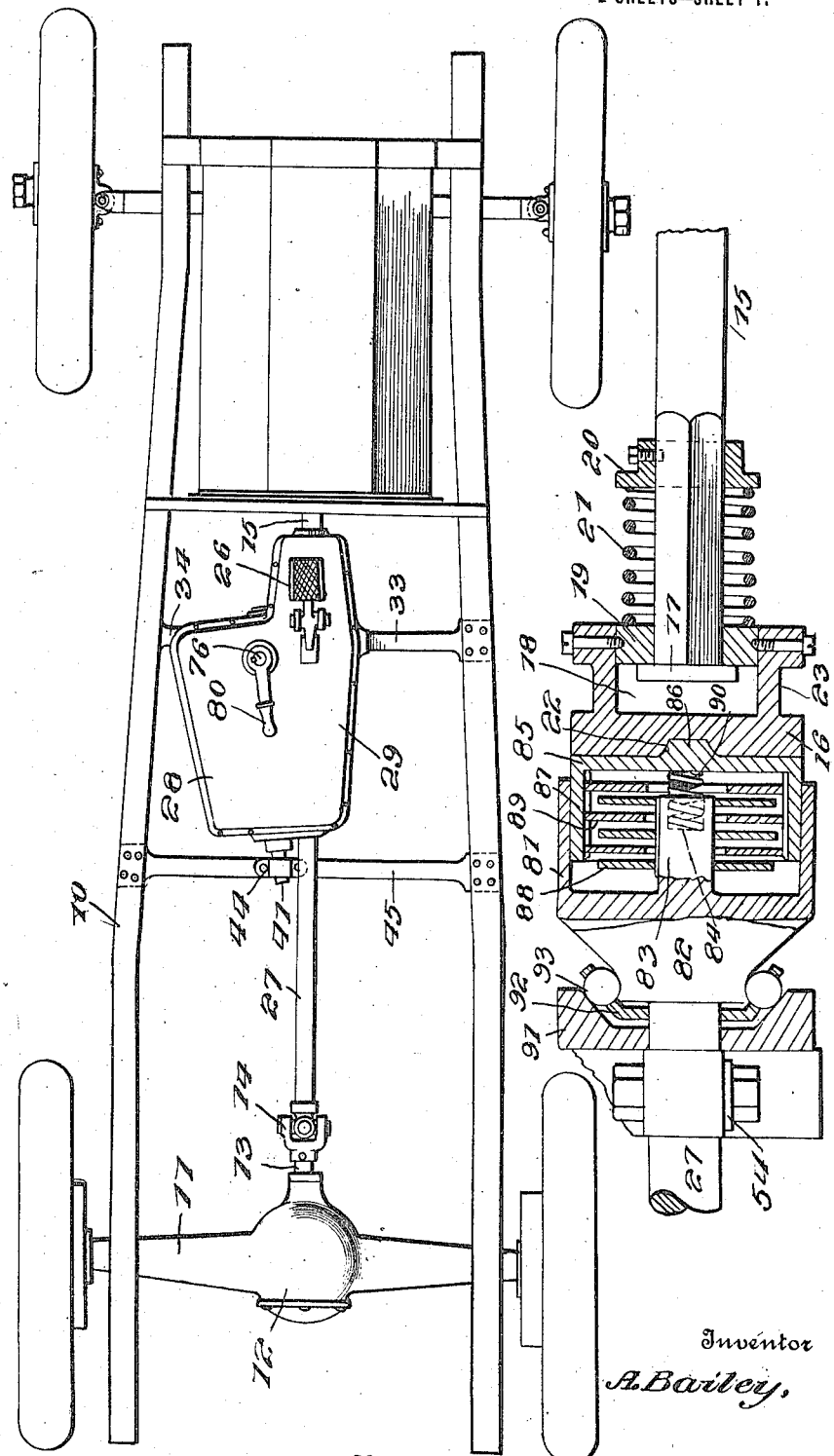

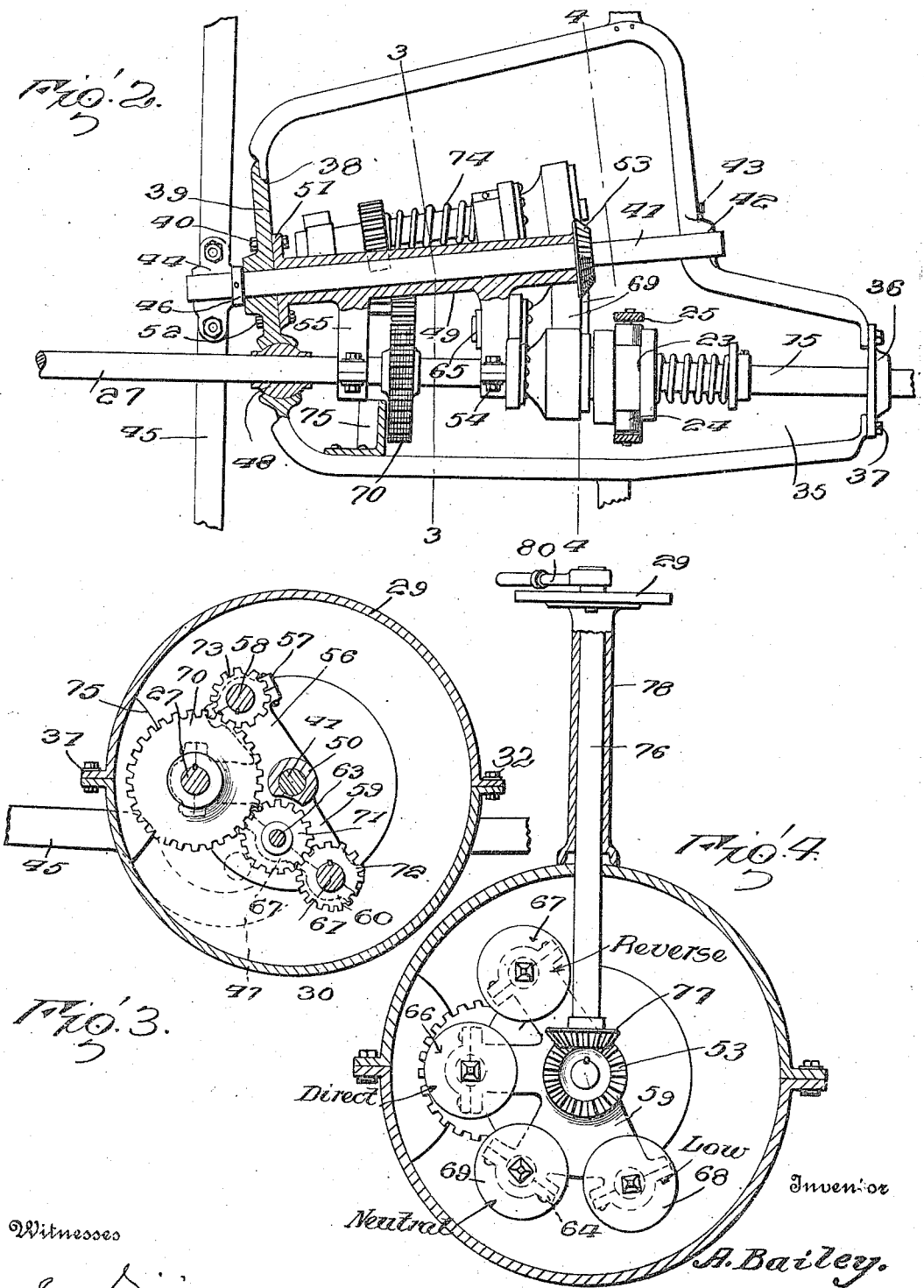

AUBURN BAILEY, OF OAKLAND, CALIFORNIA.

SHIFTING MULTIPLE-CLUTCH DEVICE.

1,136,922.

Specification of Letters Patent. Patented Apr. 27, 1915.

Application filed July 13, 1914. Serial No. 850,787.

*To all whom it may concern:*

Be it known that I, AUBURN BAILEY, citizen of the United States, residing at Oakland, in the county of Alameda and State of California, have invented certain new and useful Improvements in Shifting Multiple-Clutch Devices, of which the following is a specification.

My present invention relates to new and useful improvements in power transmission mechanisms, particularly to mechanisms of that type employed in transmitting power from the crank shaft of an engine to the rear axle of self-propelled vehicles, the primary object of my invention being the provision of a multiple clutch transmission mechanism of improved type.

In ordinary transmission practice, sets of intermeshing gears are employed for transmitting power, the speed ratio at which the power is transmitted being dependent upon the relative diameters of the meshing gears and the gears being selectively brought into mesh by means of a hand lever or other suitable mechanism, a clutch being also employed to interrupt the transmission of power during the shifting of the gears or at times when the vehicle is to remain stationary when the engine is running and the gears in mesh.

My present invention comprehends the provision of a transmission mechanism employing a drive shaft operatively connected to the differential mechanism of the vehicle at its rear end and to a clutch member at its forward end, this clutch member being adapted to mate with a sliding clutch member carried by the crank shaft of the engine.

It further comprehends the provision of a plurality of jack shafts having gears either in mesh with a gear carried by the drive shaft, or movable into mesh with said gear, and each having a clutch member corresponding to the clutch member of the drive shaft. The drive shaft and jack shafts are so arranged and mounted upon a revolving support that they may be turned from place to place to selectively bring the clutch member carried by any one of the shafts into alined engagement with the clutch member of the crank shaft.

A further object of my invention is to so arrange such gears upon the jack shafts as are not normally in mesh with the gear of the drive shaft, that they will be automatically brought into mesh with such gear, as soon as the drive shaft and jack shafts are turned to bring any one of the jack shafts into alinement with the clutch member on the crank shaft.

A further object of my invention consists in the provision of means for automatically moving the gears out of mesh upon turning of the drive and jack shafts to another position. And a still further object of my invention consists in the provision of a novel means for turning the drive and jack shafts to selectively bring any one of the shafts in alinement with the crank shaft of the engine.

With these and other objects in view, my invention will be more fully described, illustrated in the accompanying drawings, and then specifically pointed out in the claims which are attached to and form a part of this application.

In the drawings: Figure 1 is a top plan view of the running gear of a conventional motor vehicle, showing my improved transmission mechanism applied thereto; Fig. 2 is a top plan view of the transmission mechanism inclosing box or housing, with its cover plate removed, showing the manner of mounting the drive shaft, jack shafts and their clutch members, certain portions of the housing and shaft supporting bracket being shown in section; Fig. 3 is a transverse sectional view taken on the line 3—3 of Fig. 2, looking in the direction of the arrow; Fig. 4 is a similar view taken on the line 4—4 of Fig. 2; Fig. 5 is a fragmentary sectional view, illustrating the construction of the co-acting clutch members employed in my transmission mechanism.

Corresponding and like parts are referred to in the following description and indicated in all the views of the drawings by the same reference characters.

In order to insure a clear and complete understanding of my invention I have illustrated it in connection with a conventional form of motor vehicle including side frame members 10, a rear axle housing 11, having a differential gearing 12, the shaft 13 from which is connected to a universal joint 14 located immediately in advance of the differential housing. The crank shaft 15 from the engine is, of course, in direct longitudinal alinement with the shaft section 13 and at its free end is squared to slidably receive the clutch member 16, the end of the shaft 15 being provided with a collar 17 fitting within a socket 18 in the forward face of the clutch member 16, which clutch member is held against disengagement from the shaft 15 by a collar 19 which engages with the collar 17. The shaft 15 carries a second collar 20 in spaced relation to the first and a strong helical spring 21, surrounding the shaft, bears between the collar 20 of the shaft and the forward face of the clutch member 16.

The rear face of the clutch member 16 is provided with a tapered socket 22 having angularly disposed faces for locking engagement with a mating clutch member, which will be later described. The clutch member 16 is further provided with a peripheral channel 23 to receive the rollers 24 carried by the fork arms of the clutch operating member 25, which in turn is operated by the usual clutch pedal 26. By this arrangement, the clutch member 16 may be forced along the shaft 15 against the spring 21 but will normally be held by the spring with the collars 17 and 19 in engagement with each other.

The shaft section 13 is connected by the universal joint 14 with a drive shaft section 27, the forward portion of which extends into the transmission mechanism housing 28. This transmission mechanism housing includes upper and lower housing members 29 and 30 provided with peripheral flanges 31 at their mating edges to receive clamp bolts 32 by means of which the housing members are connected. The housing thus formed is supported intermediate its length by laterally directed brackets 33 and 34 secured to and extending inwardly from the side bars 10 of the running body of the vehicle. As clearly shown in Figs. 1 and 2 of the drawings, the forward end of the housing thus formed is provided with an extension 35 to receive the crank shaft 15 and its clutch member 16, the forward end of this extension being provided with a cap plate 36 secured by bolts 37, or other suitable fastening means. The rear end of the housing is provided with a circular opening 38 closed by a cap plate 39 having a central opening 40 to receive a supporting shaft 41. The forward end of this shaft seats in a thickened portion 42 in the front wall of the housing, being secured against rotation by a lock bolt 43, while the rear end seats in a bracket 44 carried by a cross brace 45, the free ends of which are connected to the side members 10 of the vehicle frame, a thrust collar 46 being preferably interposed between the bracket 44 and the rear face of the cap plate 39. For a reason which will be hereinafter explained, the cross brace 45 is formed immediately at the right of the bracket 44 with a downwardly directed bend as shown at 47 in Fig. 3. The cap plate 39 is also provided with a ball and socket bearing 48 to receive and journal the drive shaft section 27.

Mounted for rotation upon the supporting shaft 41 is a supporting member or bracket 49 in the form of a sleeve 50, the rear end of this sleeve being flanged as shown at 51 in order that it may be secured by bolts 52 to the cap plate 39, which rotates with it while the forward end of the sleeve carries a bevel gear 53, this gear being secured against turning movement independent of the sleeve. At this point it should be noted that the supporting shaft 41, and consequently the bracket sleeve 49, are radially disposed with respect to the universal joint 14, as also is the drive shaft section 27.

That end of the drive shaft section 27, extending within the transmission mechanism housing, is journaled in a pair of alined bearings 54 carried by spaced arms 55 extending radially from the bracket sleeve 50. The bracket sleeve 50 is further provided at one side of its arms 55 with a second pair of alined, radially extending arms 56 provided with bearings 57 to rotatably receive a jack shaft 58. In addition to this, the bracket sleeve 50 is provided at the other side of the arms 55 with another pair of alined, radially disposed arms 59 having alined bearings 60 to receive a jack shaft 61, and alined bearings 62 to receive a jack shaft 63. All of the jack shafts 58, 61 and 63 are in radial alinement with the universal joint 14 and, in addition, the jack shafts 58 and 61 and the drive shaft 27 are all concentrically disposed about the supporting shaft 41 in such a manner that by turning the supporting sleeve 50 about the supporting shaft 41, in the proper manner, as permitted by the revolving cap plate 39 and ball and socket bearing 48, any one of these shafts may be brought into direct alinement between the universal joint 14 and the crank shaft 15. That arm 59 located adjacent the forward end of the bracket 49 also carries a third bearing 64 to receive a stub shaft 65, also in radial alinement with the universal joint 14 and concentrically arranged with respect to the jack shafts, about the supporting shaft 41. The drive shaft section 27, jack shafts 58 and 61, and stub shaft 65 carry, at their forward ends, clutch members 66, 67, 68 and 69, respectively, each of these clutch members being adapted to coact with the clutch member 16 of the crank shaft when brought into proper alinement therewith. The specific construction of all of these clutch members is the same and a detailed explanation of such construction will be given at a later time. At this point, all that is necessary to say is that when any one of these clutch members is brought into active engagement with the clutch member 16 of the crank shaft, the shaft carrying such clutch member will be driven by the crank shaft.

A spur gear 70 is keyed or otherwise secured to that portion of the drive shaft section 26 between its supporting bearings 54 and constantly meshes with an idler pinion 71 carried by the jack shaft 63. The jack shaft 61 carries a spur gear 72 which is keyed or otherwise secured to its shaft in such a manner as to turn therewith and at the same time be free for limited longitudinal movement upon such shaft, this movement being such as to permit sliding of the gear 72 either into or out of mesh with the idler pinion 71. A spur gear 73 is similarly secured upon the jack shaft 58 in such a manner that it may be slid either into or out of mesh with the spur gear 70 of the drive shaft section 27. Helical springs 74 surround the jack shafts 58 and 61, engaging against the forward supporting arms of such shafts and against the forward faces of the gears 73 and 72, to normally hold such gears in rearward position, under which circumstances they are both out of mesh with the gear 70 and pinion 71.

Secured to and extending interiorly of the transmission mechanism housing, is a shifter cam 75, in the form of an arcuate plate, this cam being so located that when either of the jack shafts 58 or 61 is swung into alinement with the crank shaft 15, its gear will be engaged by the cam member and forced forwardly against its spring 74 until it is brought into mesh with the gear 70 of the drive shaft section 27.

In order to provide means for turning the supporting bracket 49, which carries the drive shaft section 27, jack shafts and stub shaft 63, a shaft 76 is projected through the upper member 29 of the transmission mechanism housing and provided at its lower end with a bevel gear 77 meshing with the bevel gear 53 of the bracket sleeve 50. That portion of the shaft 76, exterior of the transmission mechanism housing, is preferably inclosed in a protective sleeve 78, which extends through the floor of the vehicle at a point readily accessible to the driver, terminating at its upper end in an indicating disk 79. The upper end of the shaft 76 extends slightly beyond this disk and is provided with a radially extending hand lever 80 by means of which the shaft 76 may be turned to turn the supporting bracket 49. Notches or other suitable means may be provided upon the indicating disk 79 in order that the operator may readily determine, from the position of the hand lever or handle 80, the position of the gears.

Each of the clutch members carried by the drive shaft section 27 of the various jack shafts, as well as that carried by the countershaft 65, includes a hollow cylindrical body portion 81 having a closed hub portion 82 at its rear end for engagement with the shaft upon which such clutch member is mounted and interiorly provided at its other end with a centrally located stud 83 formed in its outer end with a socket 84. Each of such clutch members further includes a clutch plate 85 having a centrally formed, angularly faced stud 86 to seat in the socket 22 of the clutch member 16 and provided with a laterally directed peripheral flange 87 seating snugly within the body portion 81. The stud 83 carries a plurality of spaced friction disks 88, which are keyed or otherwise secured to the stud against independent turning movement, while the flange 87 carries a plurality of friction disks 89 similarly secured to the flange, each of these disks being located between adjacent disks 88 in such a manner that when the clutch plate 85 is forced rearwardly, all of the disks are brought into close frictional contact, as is customary in multiple disk clutches. A relatively light helical spring 90 seats in the socket 84 of the stud 83 and bears against the clutch plate 85 to normally hold the friction disks 88 and 89 in spaced relation.

I preferably provide, between the forward bearing of each of the clutch member carrying shafts and its clutch, a thrust collar 91 having a dished forward face to receive a cage 92 carrying a plurality of ball bearings 93 which engage against the concaved face of the thrust collar and against the rear face of the adjacent clutch member, these ball bearings taking up all thrust of the clutch member when engaged by the coacting clutch member 16.

Having thus described the construction of my improved multiple clutch transmission gearing, I will now explain its operation, particular reference being had to Figs. 2 to 4 inclusive of the drawings. For the sake of convenience in this explanation, I will assume that the clutch member 69 carried by the stub shaft 63 is in locking engagement with the clutch member 16 of the crank shaft, this being the neutral position of the transmission mechanism. In this position, it will be clear that the engine may be started in the usual manner without transmitting power to the rear axle, as the rotation of the crank shaft 15 will merely result in rotating the idly mounted clutch member 69 and its shaft, there being absolutely no connection between the stub shaft 65 and any of the remaining shafts.

When the vehicle is to be started, the foot pedal 26 is depressed to free the clutch member 16 from the clutch member 69 and the hand lever 80 manipulated to partially revolve the bracket sleeve 50, and all shafts carried thereby, to bring the jack shaft 61 and its clutch member 68 into alinement with the crank shaft 15, such position of the parts being readily determinable by the relative position of the hand lever 80 with respect to the notches or other indicating marks of the disk 79. When the parts have been brought to this position, the pressure is gradually removed from the clutch pedal 26 to permit engagement of the clutch member 16 with the clutch member 68 when it will be clear that the revolving crank shaft 15 will drive the jack shaft 61. At the same time that the jack shaft 61 is swung into alinement with the crank shaft 15, its spur gear 72 is brought into engagement with the shifter cam 75, with the result that it is forced into mesh with the idler pinion 71 carried by the shaft 63. As this pinion is, at all times, in mesh with the spur gear 70 of the drive shaft section 27, it will be clear that the movement of the crank shaft 15 will be transmitted through the gear 72, pinion 71 and gear 70 to the drive shaft and so to the rear axle, the crank shaft and drive shaft section both revolving in the same direction. The meshing gears and pinions are so formed that this drive constitutes the low speed drive of the transmission gearing.

In order to bring the transmission mechanism into position for a second or high speed drive, the clutch member 16 is forced away from the clutch member 68 and the hand lever 80 manipulated to bring the drive shaft section 27 into alinement with the crank shaft 15 when the clutch member 16 is released to engage the clutch member 66. Under these conditions, the drive is direct from the crank shaft to the drive shaft section 27.

In order to reverse the direction of movement of the car, assuming that the transmission gearing is in neutral position, the clutch is thrown out in the usual manner and the hand lever 80 manipulated to bring the jack shaft 58 into alinement with the crank shaft, after which the clutch member is released to bring it into engagement with the clutch member 67 of such jack shaft. At the same time that the shaft 58 is brought into alinement with the crank shaft, its spur gear 73 is brought into engagement with the shifter cam 75, and consequently forced into mesh with the spur gear 70 of the drive shaft section 27. The power is, therefore, transmitted from the crank shaft 15 to the jack shaft 57 and from this jack shaft to the drive shaft section 27, the crank shaft and drive shaft section 27 then rotating in opposite directions.

It will be clear that, assuming the car is at rest, none of the gears will be rotating and there is, therefore, no possibility of injury to the gears during shifting of the transmission mechanism, under these circumstances. Even, however, if the vehicle is moving and the gear 70 consequently rotating, there will be absolutely no load on whichever of the gears 71 or 73 is being brought into mesh with the gear 70, such gears being stationary at the time, and so under these circumstances no injury can result.

From the foregoing description, it will be apparent that no gears are moved into or out of mesh when both are under load and that all stripping of gears is therefore avoided. Furthermore, as the transmission is through clutches of the multiple disk type, the provision of a plurality of intermediate speeds, such as are necessary in the present day gear transmission mechanisms, is unnecessary. However, such intermediate gear speeds may be supplied, if desired, by merely adding additional countershafts, each with its clutch member capable of being brought into alinement with the crank shaft and each provided with a gear of suitable size capable of being brought into mesh with a gear of the drive shaft section 27.

It will of course be understood that I do not wish to limit myself to the specific details of construction, illustrated and described, as various changes, within the scope of the appended claims, may be made at any time, without in the slightest degree departing from the spirit of my invention.

Having thus described the invention, what is claimed as new is:

1. In a power transmission mechanism, the combination with a driven clutch member, of a driving shaft, a clutch member thereon, a plurality of concentrically arranged clutch members adapted, together with the clutch member of the driving shaft, to co-act with the driven clutch member and movable into selective engagement therewith, and means for transmitting power from any one of the plurality of clutch members to the driving shaft.

2. In a power transmission mechanism, the combination with a driven clutch member, of a driving shaft having a co-acting clutch member, a plurality of jack shafts having clutch members adapted to co-act with the driven clutch member, means for simultaneously revolving the driving shaft and jack shafts to selectively bring their clutch members into engagement with the driven clutch member, and means for transmitting power from the jack shafts to the driving shaft.

3. In a power transmission mechanism, the combination with a driven clutch member and a driving shaft including a universal joint, of a clutch member carried by the driving shaft to co-act with the driven clutch member, a plurality of jack shafts, co-acting clutch members carried by the jack shafts for engagement with the driven clutch member, supporting means for the driving shaft and jack shafts, means for revolving the supporting means of such shafts to selectively bring the clutch members of such shafts into engagement with the driven clutch member, and means for transmitting power from the jack shafts to the driving shaft.

4. In a power transmission mechanism, the combination with a clutch member and a driving shaft including a universal joint, of a co-acting clutch member carried by the driving shaft, a plurality of jack shafts, co-acting clutch members carried by the jack shafts for engagement with the driven clutch member, means for simultaneously revolving the driving shaft and jack shafts to selectively bring their clutch members into engagement with the driven clutch member, and means for transmitting power from any jack shaft to the driven shaft, said means becoming operative only when the clutch member of such jack shaft is in engagement with the driven clutch member.

5. In a power transmission mechanism, the combination with a clutch member carried by a crank shaft and a driven shaft carrying a universal joint, of a plurality of concentrically arranged shafts radially disposed with respect to the universal joint, one of said shafts being operatively connected to such joint, clutch members carried by all of said concentrically arranged shafts and adapted for engagement with the driven clutch member, and means for bringing any one of such clutch members into engagement with the clutch member of the crank shaft.

6. In a power transmission mechanism, the combination with a clutch member carried by a crank shaft and a driven shaft carrying a universal joint, of a plurality of concentrically arranged shafts radially disposed with respect to the universal joint, one of said shafts being operatively connected to such joint, clutch members carried by all of said concentrically arranged shafts and adapted for engagement with the driven clutch member, a support for said shafts to maintain them in concentric relation, and means for revolving the support to bring any one of the shafts in alinement with the clutch shaft.

7. In a power transmission mechanism, the combination with a clutch member carried by a crank shaft and a driven shaft having a universal joint, of a driving shaft connected at one end to the universal joint and having a clutch member at its other end adapted for engagement with the driven clutch member, a revoluble support for the driving shaft disposed radially with respect to the universal joint, a plurality of jack shafts also carried by the support and extending radially with respect to the joint and concentrically with respect to each other and the driving shaft, clutch members carried by said jack shafts, and means for transmitting power from the jack shafts to the driving shaft.

8. In a power transmission mechanism, the combination with a clutch member carried by a crank shaft and a driven shaft having a universal joint, of a driving shaft connected at one end to the universal joint and having a clutch member at its other end adapted for engagement with the driven clutch member, a revoluble support for the driving shaft disposed radially with respect to the universal joint, a plurality of jack shafts also carried by the support and extending radially with respect to the joint and concentrically with respect to each other and the driving shaft, clutch members carried by said jack shaft, means for transmitting power from the jack shafts to the driving shaft, means for revolving the support to bring any one of its shafts into alinement with the crank shaft.

9. In a power transmission mechanism, the combination with a clutch member and a shaft to be driven, of a driving shaft operatively connected to the shaft to be driven, a revoluble support carrying the driving shaft, a clutch member carried by the driving shaft to co-act with the first clutch member, a plurality of additional clutch members carried by the support to co-act with the first clutch member, and means for transmitting power from certain of said additional clutch members, when engaged with the first clutch member, to transmit power to the driving shaft.

10. In a power transmission mechanism, the combination with a clutch member carried by a crank shaft and a driven shaft, of a plurality of shafts having clutch members adapted to co-act with the clutch member of the crank shaft, and means for selectively transmitting power from such shafts to the driven shaft and from the first clutch member directly to the driven shaft.

11. In a transmission gearing, the combination with a reciprocally mounted driven clutch member and a driving shaft having universal joint connection with a differential mechanism, of a supporting shaft radially disposed with respect to the universal joint and out of alinement with such joint and the crank shaft, a supporting bracket revolubly mounted on the supporting shaft, bearings carried by such bracket for the driving shaft, additional bearings carried by such bracket, a plurality of jack shafts mounted in the additional bearings, the jack shafts and driving shaft being supported concentrically with respect to each other by such bearings and radially with respect to the universal joint, and clutch members carried by the driving shaft and jack shafts and adapted for co-action with the driven clutch member.

12. In a transmission gearing, the combination with a reciprocally mounted driven clutch member and a driving shaft having universal joint connection with a differential mechanism, of a supporting shaft radially disposed with respect to the universal joint and out of alinement with such joint and the crank shaft, a supporting bracket revolubly mounted on the supporting shaft, bearings carried by such bracket for the driving shaft, additional bearings carried by such bracket, a plurality of jack shafts mounted in the additional bearings, the jack shafts and driving shaft being supported concentrically with respect to each other by such bearings and radially with respect to the universal joint, clutch members carried by the driving shaft and jack shafts and adapted for co-action with the driven clutch member, and means for revolving the supporting bracket to bring the various clutch members into selective alinement with the crank shaft.

13. In a transmission gearing, the combination with a reciprocally mounted driven clutch member and a driving shaft having universal joint connection with a differential mechanism, of a supporting shaft radially disposed with respect to the universal joint and out of alinement with such joint and the crank shaft, a supporting bracket revolubly mounted on the supporting shaft, bearings carried by such bracket for the driving shaft, additional bearings carried by such bracket, a plurality of jack shafts mounted in the additional bearings, the jack shafts and driving shaft being supported concentrically with respect to each other by such bearings and radially with respect to the universal joint, clutch members carried by the driving shaft and jack shafts and adapted for co-action with the driven clutch member, and means for revolving the supporting bracket to bring the various clutch members into selective alinement with the crank shaft, said means including a bevel gear carried by the supporting bracket, a shaft, a bevel gear carried by shaft and meshing with the first gear, and a hand lever carried by the shaft.

In testimony whereof I affix my signature in presence of two witnesses.

AUBURN BAILEY. [L. S.]

Witnesses:
  G. F. FISHER,
  E. S. SYLVESTER.

Copies of this patent may be obtained for five cents each, by addressing the "Commissioner of Patents, Washington, D. C."